United States Patent
Choi et al.

(10) Patent No.: US 9,230,464 B2
(45) Date of Patent: Jan. 5, 2016

(54) METHOD OF DRIVING SHUTTER GLASSES AND DISPLAY SYSTEM FOR PERFORMING THE SAME

(75) Inventors: Jae-Ho Choi, Seongnam-si (KR); Bo-Ram Kim, Asan-si (KR); Byoung-Jun Lee, Asan-si (KR); Yun-Jae Kim, Asan-si (KR); Nam-Hee Goo, Asan-si (KR); Myoung-Chul Kim, Suwon-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 1139 days.

(21) Appl. No.: 13/242,154

(22) Filed: Sep. 23, 2011

(65) Prior Publication Data

US 2012/0249523 A1    Oct. 4, 2012

(30) Foreign Application Priority Data

Mar. 28, 2011    (KR) .................. 10-2011-0027711

(51) Int. Cl.
| G06T 15/00 | (2011.01) |
| G09G 3/00 | (2006.01) |
| H04N 13/04 | (2006.01) |

(52) U.S. Cl.
CPC ........... G09G 3/003 (2013.01); H04N 13/0438 (2013.01); H04N 13/0497 (2013.01); H04N 2213/008 (2013.01)

(58) Field of Classification Search
None
See application file for complete search history.

(56) References Cited

U.S. PATENT DOCUMENTS

| 5,942,774 | A * | 8/1999 | Isogai et al. .................. 257/292 |
| 6,687,399 | B1 * | 2/2004 | Chuang et al. ................ 382/154 |
| 7,348,952 | B2 * | 3/2008 | Chang ............................. 345/87 |
| 7,684,682 | B2 * | 3/2010 | Huang .......................... 388/815 |
| 2004/0239874 | A1 | 12/2004 | Swab et al. |
| 2006/0274017 | A1 * | 12/2006 | Nakao ............................. 345/98 |
| 2008/0136983 | A1 * | 6/2008 | Huang ............................. 349/38 |
| 2008/0158095 | A1 | 7/2008 | Neidrich et al. |
| 2009/0128528 | A1 * | 5/2009 | Takata .......................... 345/206 |

FOREIGN PATENT DOCUMENTS

| JP | 2010-062767 | 3/2010 |
| KR | 10-2008-0026877 | 3/2008 |

* cited by examiner

*Primary Examiner* — Kate Luo
(74) *Attorney, Agent, or Firm* — Cantor Colburn LLP

(57) ABSTRACT

A method of driving shutter glasses of a display system includes generating a display panel driving signal which drives a display panel of the display system, where the display panel displays a left image and a right image, generating a second three-dimensional ("3D") synchronizing signal based on a first 3D synchronizing signal and the display panel driving signal, generating a third 3D synchronizing signal by adjusting an intensity of the second 3D synchronizing signal, generating a shutter control signal, which controls a left shutter and a right shutter of the shutter glasses, based on the third 3D synchronizing signal, and outputting the shutter control signal to the shutter glasses.

18 Claims, 5 Drawing Sheets

METHOD OF DRIVING SHUTTER GLASSES AND DISPLAY SYSTEM FOR PERFORMING THE SAME

This application claims priority to Korean Patent Application No. 2011-0027711, filed on Mar. 28, 2011, and all the benefits accruing therefrom under 35 U.S.C. §119, the content of which in its entirety is herein incorporated by reference.

BACKGROUND OF THE INVENTION

1. Field of the Invention

Exemplary embodiments of the invention relate to a method of driving shutter glasses and display system for performing the method. More particularly, exemplary embodiments of the present invention relate to a method of driving shutter glasses which adjusts a communication distance between a display panel and the shutter glasses and a display system for performing the method.

2. Description of the Related Art

Generally, a liquid crystal display apparatus displays a two dimensional ("2D") image. As a demand for displaying a three dimensional ("3D") image have been increasing in video game and movie industries, the liquid crystal display apparatus has been developed to display the 3D image.

Generally, a stereoscopic image display apparatus displays the 3D image using a binocular parallax between two eyes of a human. For example, as two eyes of a human are spaced apart from each other, images viewed at different angles are inputted to a human brain. The human brain mixes the images such that an observer recognizes the stereoscopic image.

The stereoscopic image display device may be divided into a stereoscopic type and an auto-stereoscopic type depending on whether a viewer wears an extra spectacle or not. The stereoscopic type may include an anaglyph type and a shutter glasses type and so on. In the anaglyph type, blue glasses and red glasses may be required for the viewer to wear. In the shutter glasses type, a left image and a right image may be temporally divided to be periodically displayed, and a viewer wears glasses which opens and closes a left shutter and a right shutter in synchronization with the period of the left and right images.

In the shutter glasses type, the left image and the right image displayed on the display panel is synchronized with the left shutter and the right shutter of the shutter glasses. The display apparatus outputs a shutter control signal to the shutter glasses.

An intensity of the shutter control signal influences a viewing distance of the display apparatus. In a conventional display system, an intensity of the shutter control signal is constant such that a distance between the display panel and the shutter glasses is constant regardless of purpose and place of use of the display apparatus.

In the conventional display system, when two or more display apparatuses are closely installed, the shutter glasses may abnormally operate due to an interference of the shutter control signals of the two or more display apparatuses.

BRIEF SUMMARY OF THE INVENTION

Exemplary embodiments of the invention provide a method of driving shutter glasses in which a communication distance between a display panel and the shutter glasses is adjusted.

Exemplary embodiments of the invention also provide a display system for performing the method of driving the shutter glasses.

In an exemplary embodiment of a method of driving shutter glasses of a display system according to the invention, the method includes generating a display panel driving signal which drives a display panel of the display system, where the display panel displays a left image and a right image, generating a second three-dimensional ("3D") synchronizing signal based on a first 3D synchronizing signal and the display panel driving signal, generating a third 3D synchronizing signal by adjusting an intensity of the second 3D synchronizing signal, generating a shutter control signal, which controls a left shutter and a right shutter of the shutter glasses, based on the third 3D synchronizing signal, and outputting the shutter control signal to the shutter glasses.

In an exemplary embodiment, the display panel driving signal may include a vertical start signal which controls a gate driver of the display system, where the gate driver provides a gate signal to the display panel.

In an exemplary embodiment, the third 3D synchronizing signal may be generated using an amplifying part of the display system, where the amplifying part includes a bipolar junction transistor ("BJT").

In an exemplary embodiment, the amplifying part may further include a first resistor having a first end portion to which the second 3D synchronizing signal is inputted and a second end portion connected to a base electrode of the BJT, and a variable resistor having a first end portion connected to an emitter electrode of the BJT and a second end portion connected to a ground, where a source voltage may be applied to a collector electrode of the BJT, and an emitter electrode of the BJT and the first end portion of the variable resistor may be connected to a shutter control signal output part of the display system.

In an exemplary embodiment, the third 3D synchronizing signal may be generated using an amplifying part of the display system, where the amplifying part includes a field effect transistor ("FET").

In an exemplary embodiment, the amplifying part may further include a first resistor having a first end portion to which the second 3D synchronizing signal is inputted and a second end portion connected to a gate electrode of the FET, a second resistor having a first end portion connected to the first end portion of the first resistor and a second end portion connected to a ground, and a variable resistor having a first end portion to which a source voltage is applied and a second end portion connected to a shutter control signal output part, where a drain electrode of the FET may be connected to the shutter control signal output part of the display system, and a source of the FET may be connected to a ground.

In an exemplary embodiment, the method of driving the shutter glasses may further include generating the first 3D synchronizing signal based on input image data.

In an exemplary embodiment, the shutter control signal may be an infrared ray signal.

In an exemplary embodiment of a display system according to the invention, the display system includes a display panel which displays a left image and a right image, a driving signal generating part which generates a display panel driving signal which drives the display panel, a 3D synchronizing signal generating part which generates a second 3D synchronizing signal based on a first 3D synchronizing signal received from an outside thereof and the display panel driving signal, an amplifying part which generates a third 3D synchronizing signal by adjusting an intensity of the second 3D synchronizing signal, and a shutter control signal output part which generates a shutter control signal based on the third 3D synchronizing signal, and outputs the shutter control signal to shutter glasses, where the shutter control signal controls a left shutter and a right shutter of the shutter glasses.

In an exemplary embodiment, the display system may further include a gate driver which provides a gate signal to the display panel using the display panel driving signal, where the display panel driving signal may include a vertical start signal.

In an exemplary embodiment, the amplifying part may include a BJT.

In an exemplary embodiment, the amplifying part may further include a first resistor having a first end portion to which the second 3D synchronizing signal is inputted and a second end portion connected to a base electrode of the BJT, and a variable resistor having a first end portion connected to an emitter electrode of the BJT and a second end portion connected to a ground, where a source voltage may be applied to a collector electrode of the BJT, and an emitter electrode of the BJT and the first end portion of the variable resistor may be connected to a shutter control signal output part.

In an exemplary embodiment, the amplifying part may include a FET.

In an exemplary embodiment, the amplifying part may further include a first resistor having a first end portion to which the second 3D synchronizing signal is inputted and a second end portion connected to a gate electrode of the FET, a second resistor having a first end portion connected to the first end portion of the first resistor and a second end portion connected to a ground, and a variable resistor having a first end portion to which a source voltage is applied and a second end portion connected to a shutter control signal output part, where a drain electrode of the FET may be connected to the shutter control signal output part, and a source electrode of the FET may be connected to a ground.

In the exemplary embodiment, the 3D synchronizing signal generating part may be disposed on a display panel control board, and the amplifying part may be disposed on the display panel control board.

In an exemplary embodiment, the display system may further include a graphic processing unit ("GPU") which generates the first 3D synchronizing signal based on input image data.

In an exemplary embodiment, the GPU may be disposed on a set board. The amplifying part may be disposed on the set board.

In an exemplary embodiment, the shutter control signal may be an infrared ray signal.

According to exemplary embodiments of the method of driving the shutter glasses and the display system for performing the method of driving the shutter glasses, an intensity of the 3D synchronizing signal may be adjusted such that a communication distance between the display panel and the shutter glasses is effectively adjusted.

In an exemplary embodiment, the 3D synchronizing signal is generated based on a display panel driving signal such that the display panel and the shutter glasses are synchronized with each other more accurately.

BRIEF DESCRIPTION OF THE DRAWINGS

The above and other features and advantages of the invention will become more apparent by describing in detailed exemplary embodiments thereof with reference to the accompanying drawings, in which.

DETAILED DESCRIPTION OF THE INVENTION

Figure 1:
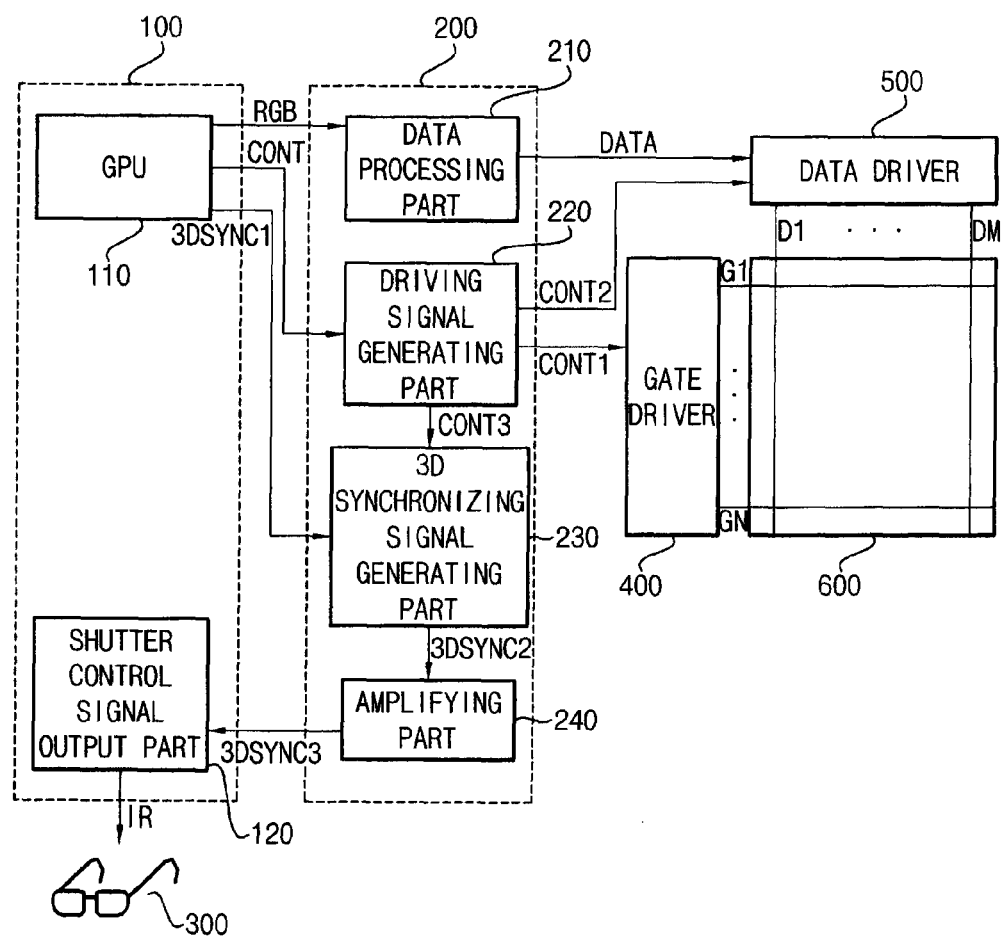
FIG. 1 is a block diagram illustrating an exemplary embodiment of a display system according to the invention.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on" or "connected to" another element or layer, the element or layer can be directly on or connected to another element or layer or intervening elements or layers. In contrast, when an element is referred to as being "directly on" or "directly connected to" another element or layer, there are no intervening elements or layers present. As used herein, "connected" includes physically and/or electrically connected. Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, exemplary embodiments of the invention will be described in further detail with reference to the accompanying drawings.

FIG. 1 is a block diagram illustrating an exemplary embodiment of a display system according to the invention.

Referring to FIG. 1, the display system includes a set board 100, a display panel control board 200, shutter glasses 300, a gate driver 400, a data driver 500 and a display panel 600.

In one exemplary embodiment, for example, the set board 100 may be disposed in a personal computer. In such an embodiment, the display panel 600 may be a part of a monitor.

In an alternative exemplary embodiment, the set board 100 may be a television set board. In such an embodiment, the display panel 600 may be a part of a television.

The set board 100 includes a graphic processing unit ("GPU") 110 and a shutter control signal output part 120. The GPU may be disposed, e.g., mounted, on the set board 100. In an exemplary embodiment, the shutter control signal output part 120 may be an infrared ray emitter. In an exemplary embodiment, the shutter control signal output part 120 may be connected to the set board 100 through a universal serial bus ("USB") port.

The GPU 110 transmits input image data RGB and a control signal CONT to the display panel control board 200. The GPU 110 generates a first three-dimensional ("3D") synchronizing signal 3DSYNC1 based on the input image data RGB. The GPU 110 outputs the first 3D synchronizing signal 3DSYNC1 to the display panel control board 200.

In one exemplary embodiment, for example, the GPU 110 may be a graphic card.

The input image data RGB may include red image data R, green image data G and blue image data B. The input image data RGB may include left image data and right image data.

The control signal CONT may include a master clock signal, a data enable signal, a vertical synchronizing signal and a horizontal synchronizing signal.

The first 3D synchronizing signal 3DSYNC1 is a signal for identifying the left and right image data. In one exemplary embodiment, for example, the first 3D synchronizing signal 3DSYNC1 may include a left signal corresponding to an activation of the left image data and a right signal corresponding to an activation of the right image data. The left signal may be substantially a square wave having a high level and a low level. The right signal may be substantially a square wave having a high level and a low level.

The display panel control board 200 includes a data processing part 210, a driving signal generating part 220, a 3D synchronizing signal generating part 230 and an amplifying part 240. The data processing part 210, the driving signal generating part 220, the 3D synchronizing signal generating part 230 and the amplifying part 240 may be disposed, e.g., mounted, on the display panel control board 200. The data processing part 210, the driving signal generating part 220 and the 3D synchronizing signal generating part 230 may be disposed in a timing controller. The data processing part 210, the driving signal generating part 220 and the 3D synchronizing signal generating part 230 may be provided as a single chip type.

The data processing part 210 receives the input image data RGB from the GPU 110. The data processing part 210 compensates and converts the input image data RGB to generate a data signal DATA. The data processing part 210 outputs the data signal DATA to the data driver 500.

The data processing part 210 may include an adaptive color correcting part (not shown) and a dynamic capacitance compensating part (not shown).

The adaptive color correcting part receives the input image data RGB. The adaptive color correcting part performs an adaptive color correction ("ACC") to the input image data RGB. The adaptive color correcting part may compensate the input image data RGB using a gamma curve.

The dynamic capacitance compensating part performs a dynamic capacitance compensation ("DCC"). In the DCC, grayscales of present frame data are compensated using previous frame data and the present frame data.

The data processing part 210 may further include a frame rate converter ("FRC") that converts a frame rate of the input image data RGB. In one exemplary embodiment, for example, the FRC increases the frame rate of the input image data RGB by twice or four times.

The driving signal generating part 220 receives the control signal CONT from the GPU 110. The driving signal generating part 220 generates a first control signal CONT1, a second control signal CONT2 and a third control signal CONT3 based on the control signal CONT. The driving signal generating part 220 outputs the first control signal CONT1 to the gate driver 400. The driving signal generating part 220 outputs the second control signal CONT2 to the data driver 500. The driving signal generating part 220 outputs the third control signal CONT3 to the 3D synchronizing signal generating part 230.

The first control signal CONT1 may include a vertical start signal, a gate clock signal and a gate on signal. The second control signal CONT2 may include a horizontal start signal, a load signal, an inverting signal and a data clock signal.

The third control signal CONT3 may include the vertical start signal of the first control signal CONT1. The vertical start signal controls an operation of the gate driver 400.

The 3D synchronizing signal generating part 230 receives the first 3D synchronizing signal 3DSYNC1 from the GPU 110 and the third control signal CONT3 from the driving signal generating part 220. The 3D synchronizing signal generating part 230 generates a second 3D synchronizing signal 3DSYNC2 based on the first 3D synchronizing signal 3DSYNC1 and the third control signal CONT3. The 3D synchronizing signal generating part 230 outputs the second 3D synchronizing signal 3DSYNC2 to the amplifying part 240.

The 3D synchronizing signal generating part 230 generates the second 3D synchronizing signal 3DSYNC2 using the display panel driving signal for controlling a driving timing of the display panel 600 such that the second 3D synchronizing signal 3DSYNC2 is substantially synchronized with an image displayed on the display panel 600 compared with the first 3D synchronizing signal 3DSYNC1 generated by the GPU 110.

The amplifying part 240 receives the second 3D synchronizing signal 3DSYNC2 from the 3D synchronizing signal generating part 230. The amplifying part 240 amplifies the second 3D synchronizing signal 3DSYNC2 to generate a third 3D synchronizing signal 3DSYNC3. The amplifying part 240 outputs the third 3D synchronizing signal 3DSYNC3 to the shutter control signal output part 120 disposed in the set board 100.

The amplifying part 240 may include a bipolar junction transistor ("BJT"). A composition and an operation of the amplifying part 240 will be described later in detail referring to FIG. 2.

The shutter control signal output part 120 generates a shutter control signal IR based on the third 3D synchronizing signal 3DSYNC3. The shutter control signal output part 120 outputs the shutter control signal IR to the shutter glasses 300.

The shutter control signal IR controls a left shutter and a right shutter of the shutter glasses 300. In an exemplary embodiment, the shutter control signal IR may be an infrared ray signal.

The shutter glasses 300 receive the shutter control signal IR from the shutter control signal output part 120. The shutter glasses 300 may include a signal receiving part (not shown) that receives the shutter control signal IR. In an exemplary embodiment, the signal receiving part may be an infrared ray receiver.

The shutter glasses 300 open and close the left shutter in response to the shutter control signal IR. The shutter glasses 300 open and close the right shutter in response to the shutter control signal IR.

The gate driver 400 receives the first control signal CONT1 from the driving signal generating part 220. The gate driver 400 generates gate signals for driving a plurality of gate lines G1 to GN of the display panel 600 in response to the first control signal CONT1. Here, N is a natural number. The gate driver 400 sequentially outputs the gate signals to the gate lines G1 to GN.

The gate driver 400 may be disposed, e.g., directly mounted, on the display panel 600. In an exemplary embodiment, the gate driver 400 may be connected to the display panel 600 as a tape carrier package ("TCP") type. In an alternative exemplary embodiment, the gate driver 400 may be integrated onto the display panel 600.

The data driver 500 receives the data signal DATA and the second control signal CONT2. The data driver 500 converts the data signal DATA into an analogue data voltage using a gamma reference voltage. The data driver 500 outputs the data voltage to a plurality of data lines D1 to DM of the display panel 600. Here, M is a natural number.

A gamma reference voltage generating part (not shown) generates the gamma reference voltage. The gamma reference voltage generating part outputs the gamma reference voltage to the data driver 500. In an exemplary embodiment, the gamma reference voltage generating part may be disposed in the data driver 500. In an alternative exemplary embodiment, the gamma reference voltage generating part may be disposed in the display panel control board 200.

The data driver 500 may be disposed, e.g., directly mounted, on the display panel 600. In an exemplary embodiment, the data driver 500 may be connected to the display panel 600 as a TCP type. In an alternative exemplary embodiment, the data driver 500 may be mounted on the display panel 600.

The display panel 600 includes the gate lines G1 to GN, the data lines D1 to DM, and a plurality of pixels electrically connected to the gate lines G1 to GN and the data lines D1 to DM. The gate lines G1 to GN extend in a first direction. The data lines D1 to DM extend in a second direction crossing the first direction. The second direction may be substantially perpendicular to the first direction. The pixel includes a switching element (not shown), a liquid crystal capacitor (not shown) and a storage capacitor (not shown) connected to the switching element.

Figure 2:
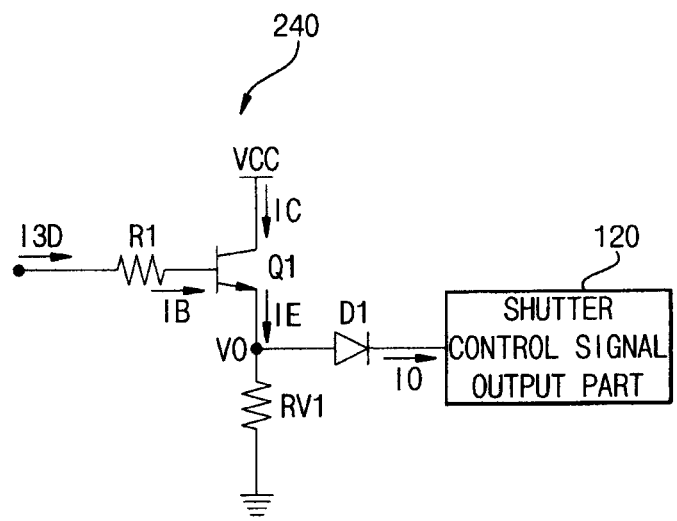
FIG. 2 is a circuit diagram illustrating an exemplary embodiment of an amplifying part of FIG. 1.

FIG. 2 is a circuit diagram illustrating an exemplary embodiment of the amplifying part 240 of FIG. 1;

Referring to FIGS. 1 and 2, the amplifying part 240 includes a first resistor R1, a BJT Q1 and a first variable resistor RV1. In an exemplary embodiment, the amplifying part 240 may further include a first diode D1.

An input current I3D is inputted to a first end portion of the first resistor R1. A second end portion of the first resistor R1 is electrically connected to a base electrode of the BJT Q1. In an exemplary embodiment, the input current I3D may be the second 3D synchronizing signal 3DSYNC2.

The base electrode of the BJT Q1 is electrically connected to the second end portion of the first resistor R1. A source voltage VCC is applied to a collector electrode of the BJT Q1. An emitter electrode of the BJT Q1 is electrically connected to a first end portion of the first variable resistor RV1. In an exemplary embodiment, the BJT Q1 may be a NPN type transistor.

The first end portion of the first variable resistor RV1 is electrically connected to the emitter electrode of the BJT Q1. A second end portion of the first variable resistor RV1 is electrically connected to a ground.

An anode electrode (+) of the first diode D1 is electrically connected to a node at which the first end portion of the first variable resistor RV1 and the emitter electrode of the BJT Q1 are connected. A cathode electrode (−) of the first diode D1 is connected to the shutter control signal output part 120.

The first diode D1 guides a direction of an output current IO. In an alternative exemplary embodiment, the first diode D1 may be omitted. In such an embodiment, the shutter control signal output part 120 may be directly connected to the node at which the first end portion of the first variable resistor RV1 and the emitter electrode of the BJT Q1 are connected.

$$VO \propto IC(RV1//RL) \quad \text{[Equation 1]}$$

In Equation 1, VO is a voltage at an output terminal. IC is a collector current of the BJT Q1. RV1 is a resistance of the first variable resistor RV1. RL is a load resistance of the shutter control signal output part 120. VO is VCC−0.2 volt (V), and thus, VO is substantially equal to VCC.

$$IE = IB + IC \quad \text{[Equation 2]}$$

In Equation 2, IB is a base current of the BJT Q1. IE is an emitter current of the BJT Q1. IB has a substantially small value, such that IE is substantially equal to IC.

According to Equation 1 and Equation 2, the voltage at the output terminal VO is constant such that the emitter current IE is decreased when the first variable resistance RV1 increases, and the emitter current IE is increased when the first variable resistance RV1 decreases.

Accordingly, the output current IO is decreased when the first variable resistance RV1 increases, and the output current IO is increased when the first variable resistance RV1 decreases. In such an embodiment, the output current IO may be the third 3D synchronizing signal 3DSYNC3.

Therefore, an intensity of the output current IO of the amplifying part 240 may be adjusted by adjusting the first variable resistance RV1.

According to the exemplary embodiment shown in FIG. 2, the amplifying part 240 adjusts an intensity of the shutter control signal IR such that a communication distance between the display panel 600 and the shutter glasses 300 is effectively adjusted.

In an exemplary embodiment, the shutter control signal IR is generated using the second 3D synchronizing signal generated based on the display panel driving signal such that the display panel 600 and the shutter glasses 300 are synchronized with each other more accurately.

Figure 3:
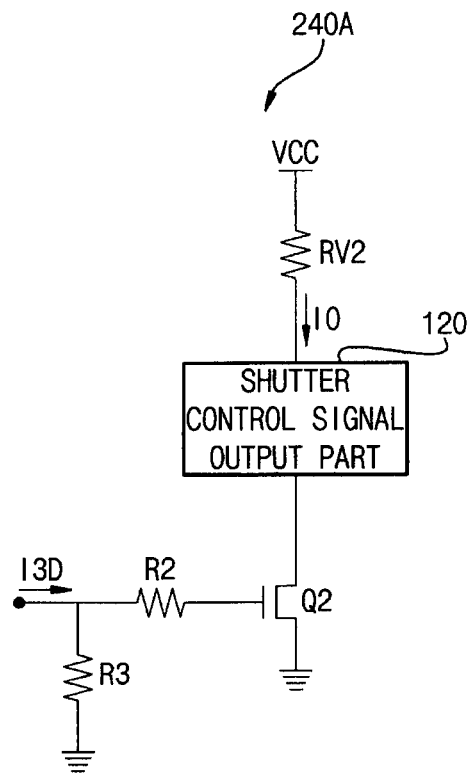
FIG. 3 is a circuit diagram illustrating an alternative exemplary embodiment of an amplifying part according to the invention.

FIG. 3 is a circuit diagram illustrating an alternative exemplary embodiment of the amplifying part 240A according to the invention.

The exemplary embodiment of a method of driving shutter glasses and a display system including the amplifying part of FIG. 3 is substantially the same as the method of driving the shutter glasses and the display system of the exemplary embodiment shown in FIGS. 1 and 2 except for the amplifying part 240A. Thus, the same or like elements shown in FIG. 3 has been labeled with the same reference characters as used above to describe the exemplary embodiment of FIGS. 1 and 2, and any repetitive description thereof will hereinafter be omitted or simplified.

Referring to FIGS. 1 and 3, the amplifying part 240A includes a second resistor R2, a third resistor R3, a field effect transistor ("FET") Q2 and a second variable resistor RV2. In an exemplary embodiment, the FET Q2 may be an N-channel type transistor.

An input current I3D is inputted to a first end portion of the second resistor R2. A second end portion of the second resistor R2 is electrically connected to a gate electrode of the FET Q2. In an exemplary embodiment, the input current I3D may be the second 3D synchronizing signal 3DSYNC2.

A first end portion of the third resistor R3 is electrically connected to the first end portion of the second resistor. A second end portion of the third resistor R3 is connected to a ground.

The gate electrode of the FET Q2 is electrically connected to the second end portion of the second resistor R2. In an exemplary embodiment, a drain electrode of the FET Q2 is electrically connected to the shutter control signal output part 120, and a source electrode of the FET Q2 is connected to a ground. In an alternative exemplary embodiment, the drain electrode of the FET Q2 may be electrically connected to ground, and a source electrode of the FET Q2 may be connected to the shutter control signal output part 120a.

A source voltage VCC is applied to a first end portion of the second variable resistor RV2. A second end portion of the second variable resistor RV2 is electrically connected to the shutter control signal output part 120.

When the FET Q2 is turned on by the input current I3D, an output current IO flows between the drain electrode and the source electrode.

The source voltage is constant such that the output current IO is decreased when the second variable resistance RV2 increases according to Ohm's law, and the output current IO is increased when the second variable resistance RV2 decreases. In an exemplary embodiment, the output current IO may be the third 3D synchronizing signal 3DSYNC3.

Therefore, an intensity of the output current IO of the amplifying part 240A may be adjusted by adjusting the second variable resistance RV2.

According to the exemplary embodiments shown in FIG. 3, the amplifying part 240A adjusts an intensity of the shutter control signal IR such that a communication distance between the display panel 600 and the shutter glasses 300 are effectively adjusted.

In addition, the shutter control signal IR is generated using the second 3D synchronizing signal generated based on the display panel driving signal such that the display panel 600 and the shutter glasses 300 are synchronized with each other more accurately.

Figure 4:
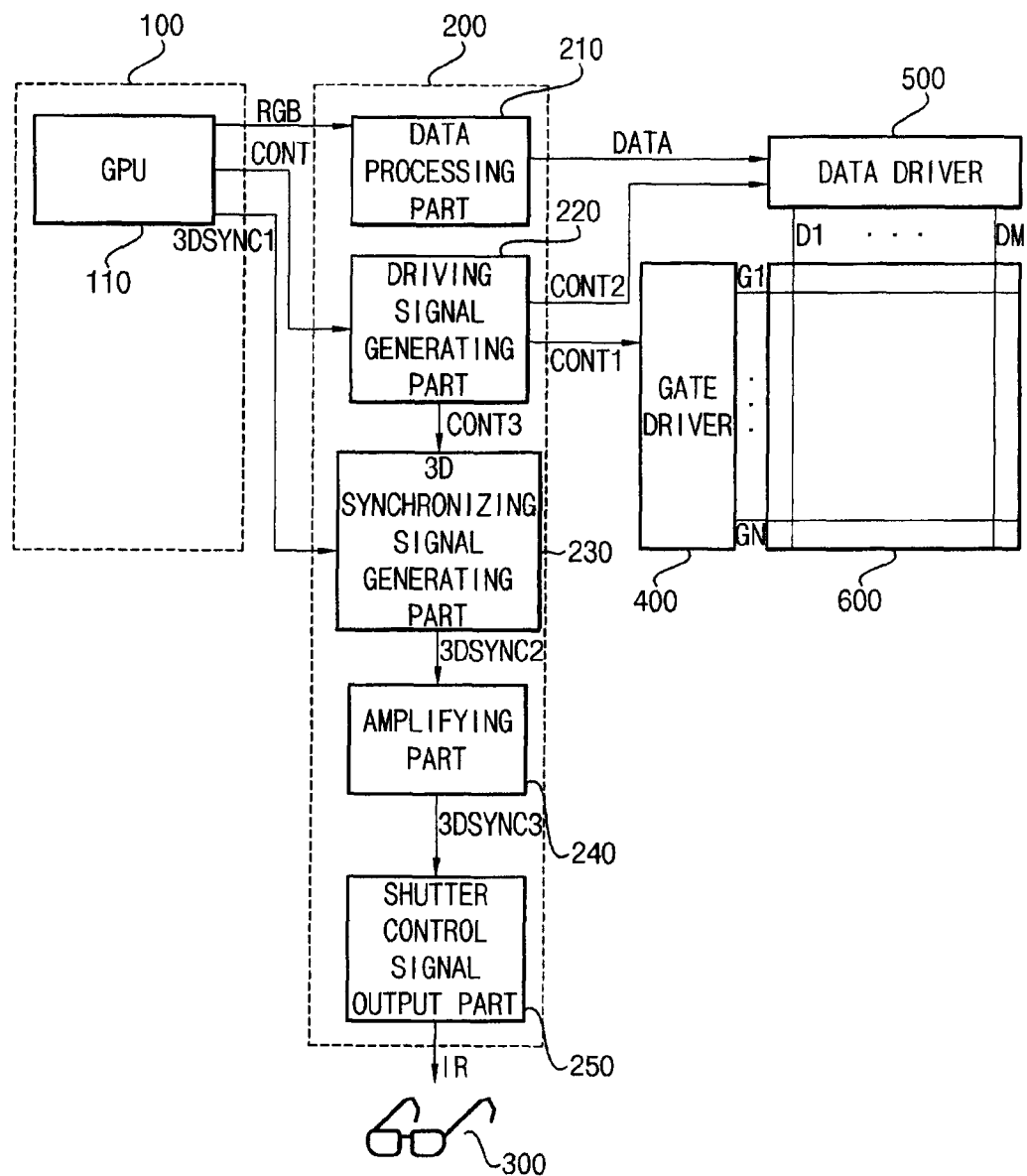
FIG. 4 is a block diagram illustrating an alternative exemplary embodiment of a display system according to the invention.

FIG. 4 is a block diagram illustrating an alternative exemplary embodiment of a display system according to the invention.

The exemplary embodiment of a method of driving shutter glasses and a display system shown in FIG. 4 is substantially the same as the method of driving the shutter glasses and the display system shown in FIGS. 1 and 2 except for a location of the shutter control signal output part 250. The same or like elements shown in FIG. 4 have been labeled with the same reference characters as used above to describe the exemplary embodiment of the display system shown in FIGS. 1 and 2, and any repetitive detailed description thereof will hereinafter be omitted or simplified.

Referring to FIG. 4, the display system includes a set board 100, a display panel control board 200, shutter glasses 300, a gate driver 400, a data driver 500 and a display panel 600.

The set board 100 includes a GPU 110. The GPU may be disposed, e.g., mounted, on the set board 100.

The GPU 110 transmits input image data RGB and a control signal CONT to the display panel control board 200. The GPU 110 generates a first 3D synchronizing signal 3DSYNC1 based on the input image data RGB. The GPU 110 outputs the first 3D synchronizing signal 3DSYNC1 to the display panel control board 200.

In one exemplary embodiment, for example, the GPU 110 may be a graphic card.

The display panel control board 200 includes a data processing part 210, a driving signal generating part 220, a 3D synchronizing signal generating part 230 and an amplifying part 240 and a shutter control signal output part 250. The data processing part 210, the driving signal generating part 220, the 3D synchronizing signal generating part 230 and the amplifying part 240 may be disposed, e.g., mounted, on the display panel control board 200. The data processing part 210, the driving signal generating part 220 and the 3D synchronizing signal generating part 230 may be disposed in a timing controller. The data processing part 210, the driving signal generating part 220 and the 3D synchronizing signal generating part 230 may be provided as a single chip type.

In an exemplary embodiment, the shutter control signal output part 250 may be an infrared ray emitter. In an exemplary embodiment, the shutter control signal output part 250 may be connected to the display panel control board 200 through a USB port.

In an exemplary embodiment, the shutter control signal output part 250 may be disposed adjacent to the display panel 600. In one exemplary embodiment, for example, the shutter control signal output part 250 may be disposed on a chassis of a display substrate of the display panel 600.

Referring to FIGS. 2 and 4, the amplifying part 240 includes a first resistor R1, a BJT Q1 and a first variable resistor RV1. The amplifying part 240 may further include a first diode D1.

An emitter current IE of the BJT Q1 is decreased when the first variable resistance RV1 increases, and the emitter current IE is increased when the first variable resistance RV1 decreases.

An output current IO of the amplifying part 240 is decreased when the first variable resistance RV1 increases, and the output current IO is increased when the first variable resistance RV1 decreases. In an exemplary embodiment, the output current IO may be the third 3D synchronizing signal 3DSYNC3.

Therefore, an intensity of the output current IO of the amplifying part 240 may be adjusted by adjusting the first variable resistance RV1.

The method of driving the shutter glasses and the display system shown in FIG. 4 may employ the amplifying part 240A in FIG. 3 instead of the amplifying part 240 in FIG. 2.

Referring to FIGS. 3 and 4, the amplifying part 240A includes a second resistor R2, a third resistor R3, a FET Q2 and a second variable resistor RV2.

The output current IO of the amplifying part 240A is decreased when the second variable resistance RV2 increases, and the output current IO is increased when the second variable resistance RV2 decreases. In an exemplary embodiment, the output current IO may be the third 3D synchronizing signal 3DSYNC3.

Therefore, an intensity of the output current IO of the amplifying part 240A may be adjusted by adjusting the second variable resistance RV2.

According to the exemplary embodiments shown in FIGS. 2 to 4, the amplifying part 240 adjusts an intensity of the shutter control signal IR such that a communication distance between the display panel 600 and the shutter glasses 300 is effectively adjusted.

In an exemplary embodiment, the shutter control signal IR is generated using the second 3D synchronizing signal generated based on the display panel driving signal such that the display panel 600 and the shutter glasses 300 are synchronized with each other more accurately.

Figure 5:
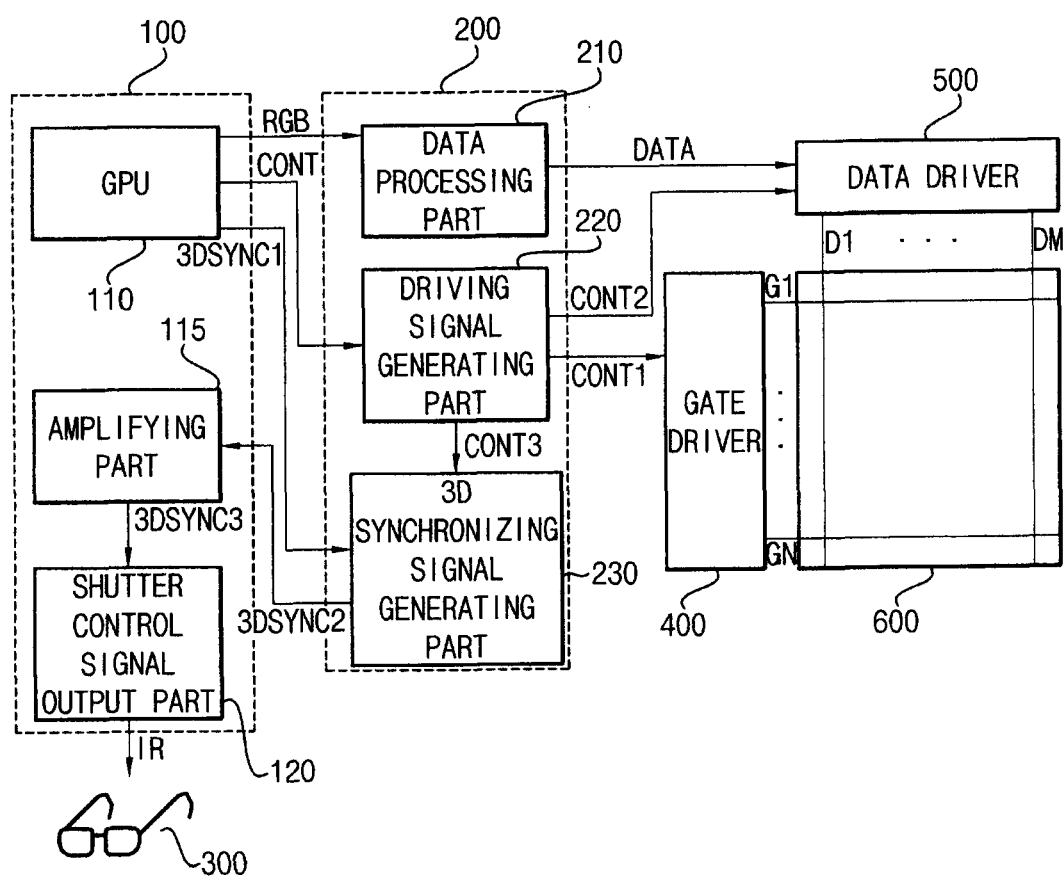
FIG. 5 is a block diagram illustrating another alternative exemplary embodiment of a display system according to the invention.

FIG. 5 is a block diagram illustrating another alternative exemplary embodiment of a display system according to the invention.

The exemplary embodiment of a method of driving shutter glasses and a display system shown in FIG. 5 is substantially the same as the method of driving the shutter glasses and the display system shown in FIGS. 1 and 2 except for a location of the amplifying part 115. The same or like elements shown in FIG. 5 have been labeled with the same reference characters as used above to describe the exemplary embodiments of the display system shown in FIGS. 1 and 2, and any repetitive detailed description thereof will hereinafter be omitted or simplified.

Referring to FIG. 5, the display system includes a set board 100, a display panel control board 200, shutter glasses 300, a gate driver 400, a data driver 500 and a display panel 600.

The set board 100 includes a GPU 110, the amplifying part 115 and a shutter control signal output part 120. The GPU and the amplifying part 115 may be mounted on the set board 100.

The GPU 110 transmits input image data RGB and a control signal CONT to the display panel control board 200. The GPU 110 generates a first 3D synchronizing signal 3DSYNC1 based on the input image data RGB. The GPU 110 outputs the first 3D synchronizing signal 3DSYNC1 to the display panel control board 200.

In one exemplary embodiment, for example, the GPU 110 may be a graphic card.

In an exemplary embodiment, the shutter control signal output part 120 may be an infrared ray emitter. The shutter control signal output part 120 may be connected to the set board 100 through a USB port.

The display panel control board 200 includes a data processing part 210, a driving signal generating part 220 and a 3D synchronizing signal generating part 230. The data processing part 210, the driving signal generating part 220 and the 3D synchronizing signal generating part 230 may be disposed, e.g., mounted, on the display panel control board 200. The data processing part 210, the driving signal generating part 220 and the 3D synchronizing signal generating part 230 may be disposed in a timing controller. The data processing part 210, the driving signal generating part 220 and the 3D synchronizing signal generating part 230 may be provided as a single chip type.

The amplifying part 115 receives the second 3D synchronizing signal 3DSYNC2 from the 3D synchronizing signal generating part 230. The amplifying part 115 amplifies the second 3D synchronizing signal 3DSYNC2 to generate a third 3D synchronizing signal 3DSYNC3. The amplifying part 115 outputs the third 3D synchronizing signal 3DSYNC3 to the shutter control signal output part 120.

Referring to FIGS. 2 and 5, the amplifying part 115 includes a first resistor R1, a BJT Q1 and a first variable resistor RV1. The amplifying part 115 may further include a first diode D1.

An emitter current IE of the BJT Q1 is decreased when the first variable resistance RV1 increases, and the emitter current IE is increased when the first variable resistance RV1 decreases.

An output current IO of the amplifying part 115 is decreased when the first variable resistance RV1 increases, and the output current IO is increased when the first variable resistance RV1 decreases. In an exemplary embodiment, the output current IO may be the third 3D synchronizing signal 3DSYNC3.

Therefore, an intensity of the output current IO of the amplifying part 115 may be adjusted by adjusting the first variable resistance RV1.

The method of driving the shutter glasses and the display system shown in FIG. 5 may employ the amplifying part 240A in FIG. 3 instead of the amplifying part 240 in FIG. 2.

Referring to FIGS. 3 and 5, the amplifying part 115 includes a second resistor R2, a third resistor R3, a FET Q2 and a second variable resistor RV2.

The output current IO of the amplifying part 115 is decreased when the second variable resistance RV2 increases, and the output current IO is increased when the second variable resistance RV2 decreases. In an exemplary embodiment, the output current IO may be the third 3D synchronizing signal 3DSYNC3.

Therefore, an intensity of the output current IO of the amplifying part 115 may be adjusted by adjusting the second variable resistance RV2.

According to the exemplary embodiments shown in FIGS. 2, 3 and 5, the amplifying part 115 adjusts an intensity of the shutter control signal IR such that a communication distance between the display panel 600 and the shutter glasses 300 is effectively adjusted.

In an exemplary embodiment, the shutter control signal IR is generated using the second 3D synchronizing signal generated based on the display panel driving signal such that the display panel 600 and the shutter glasses 300 are synchronized with each other more accurately.

Figure 6:
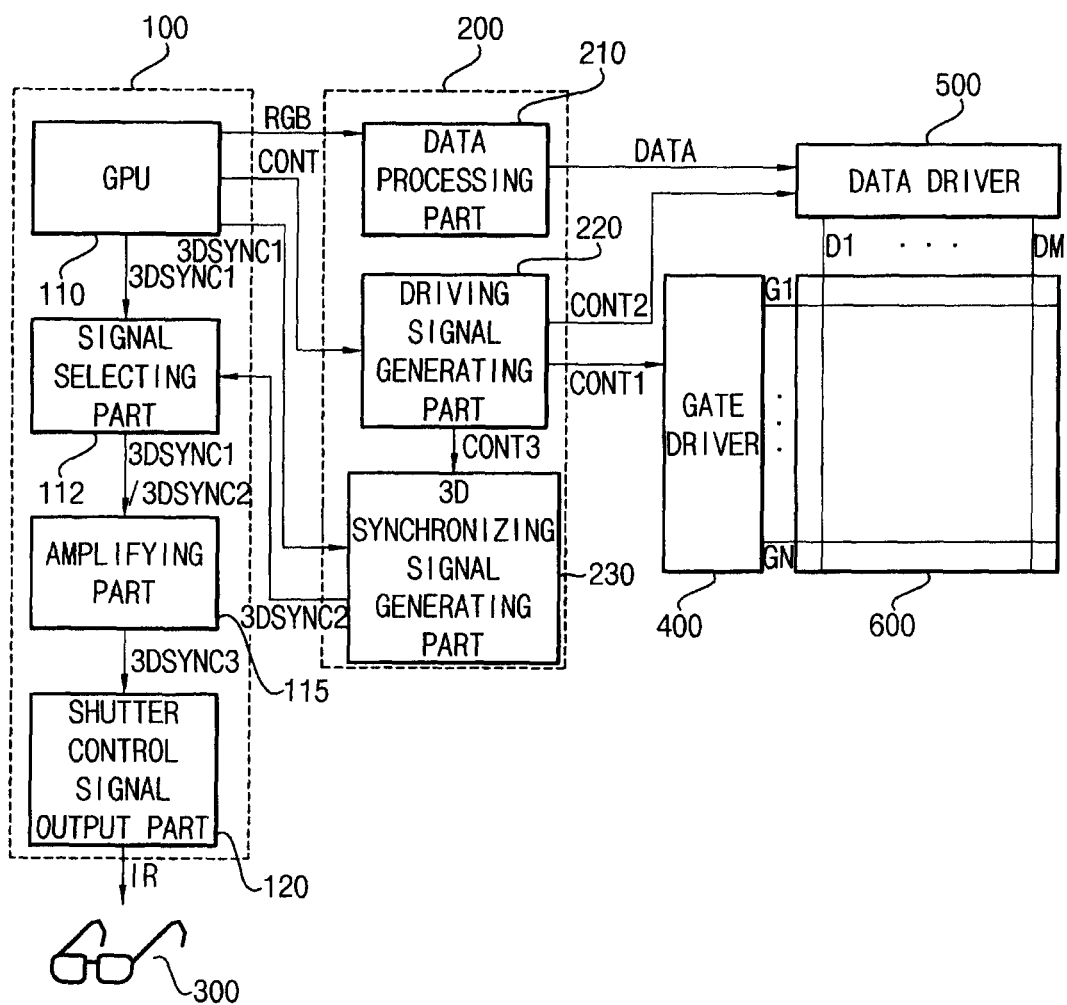
FIG. 6 is a block diagram illustrating still another alternative exemplary embodiment of a display system according to the invention.

FIG. 6 is a block diagram illustrating still another alternative exemplary embodiment of a display system according to the invention.

The exemplary embodiment of a method of driving shutter glasses and a display system shown in FIG. 6 is substantially the same as the method of driving the shutter glasses and the display system shown in FIG. 5 except for a signal selecting part 112. The same or like elements shown in FIG. 6 have been labeled with the same reference characters as used above to describe the exemplary embodiments of the display system shown in FIGS. 1 and 2, and any repetitive detailed description thereof will hereinafter be omitted or simplified.

Referring to FIG. 6, the display system includes a set board 100, a display panel control board 200, shutter glasses 300, a gate driver 400, a data driver 500 and a display panel 600.

The set board 100 includes a GPU 110, the signal selecting part 112, an amplifying part 115 and a shutter control signal output part 120. The GPU, the signal selecting part 112 and the amplifying part 115 may be disposed, e.g., mounted, on the set board 100.

The GPU 110 transmits input image data RGB and a control signal CONT to the display panel control board 200. The GPU 110 generates a first 3D synchronizing signal 3DSYNC1 based on the input image data RGB. The GPU 110 outputs the first 3D synchronizing signal 3DSYNC1 to the signal selecting part 112 and the display panel control board 200.

In one exemplary embodiment, for example, the GPU 110 may be a graphic card.

In an exemplary embodiment, the shutter control signal output part 120 may be an infrared ray emitter. In an exemplary embodiment, the shutter control signal output part 120 may be connected to the set board 100 through a USB port.

The display panel control board 200 includes a data processing part 210, a driving signal generating part 220 and a 3D synchronizing signal generating part 230. The data processing part 210, the driving signal generating part 220 and the 3D synchronizing signal generating part 230 may be disposed, e.g., mounted, on the display panel control board 200. The data processing part 210, the driving signal generating part 220 and the 3D synchronizing signal generating part 230 may be disposed in a timing controller. The data processing part 210, the driving signal generating part 220 and the 3D synchronizing signal generating part 230 may be provided as a single chip type.

The signal selecting part 112 receives the first 3D synchronizing signal 3DSYNC1 from the GPU 110. The signal selecting part 112 receives the second 3D synchronizing signal 3DSYNC2.

The signal selecting part 112 selects and transmits one of the first 3D synchronizing signal 3DSYNC1 and the second 3D synchronizing signal 3DSYNC2 to the amplifying part 115 based on an external control signal. The external control signal may be set by a user.

The signal selecting part 112 may be used for testing an operation of the shutter glasses 300 based on the first 3D synchronizing signal 3DSYNC1 and the second 3D synchronizing signal 3DSYNC2.

The amplifying part 115 receives the first 3D synchronizing signal 3DSYNC1 or the second 3D synchronizing signal 3DSYNC2 from the signal selecting part 112. The amplifying part 115 amplifies the first 3D synchronizing signal 3DSYNC1 or the second 3D synchronizing signal 3DSYNC2 to generate a third 3D synchronizing signal 3DSYNC3. The amplifying part 115 outputs the third 3D synchronizing signal 3DSYNC3 to the shutter control signal output part 120.

Referring to FIGS. 2 and 6, the amplifying part 115 includes a first resistor R1, a BJT Q1 and a first variable resistor RV1. The amplifying part 115 may further include a first diode D1.

An emitter current IE of the BJT Q1 is decreased when the first variable resistance RV1 increases, and the emitter current IE is increased when the first variable resistance RV1 decreases.

An output current IO of the amplifying part 115 is decreased when the first variable resistance RV1 increases, and the output current IO is increased when the first variable resistance RV1 decreases. In an exemplary embodiment, the output current IO may be the third 3D synchronizing signal 3DSYNC3.

Therefore, an intensity of the output current IO of the amplifying part 115 may be adjusted by adjusting the first variable resistance RV1.

The method of driving the shutter glasses and the display system shown in FIG. 6 may employ the amplifying part 240A in FIG. 3 instead of the amplifying part 240 in FIG. 2.

Referring to FIGS. 3 and 6, the amplifying part 115 includes a second resistor R2, a third resistor R3, a FET Q2 and a second variable resistor RV2.

The output current IO of the amplifying part 115 is decreased when the second variable resistance RV2 increases, and the output current IO is increased when the second variable resistance RV2 decreases. In an exemplary embodiment, the output current IO may be the third 3D synchronizing signal 3DSYNC3.

Therefore, an intensity of the output current IO of the amplifying part 115 may be adjusted by adjusting the second variable resistance RV2.

According to exemplary embodiments shown in FIGS. 2, 3 and 6, the amplifying part 115 adjusts an intensity of the shutter control signal IR such that a communication distance between the display panel 600 and the shutter glasses 300 is effectively adjusted.

In an exemplary embodiment, the shutter control signal IR is generated using the second 3D synchronizing signal generated based on the display panel driving signal such that the display panel 600 and the shutter glasses 300 are synchronized with each other more accurately.

In an exemplary embodiment according to the invention, a communication distance between the display panel and the shutter glasses is effectively adjusted.

In an exemplary embodiment, the display panel and the shutter glasses are synchronized with each other more accurately.

The foregoing is illustrative of the invention and is not to be construed as limiting thereof. Although a few exemplary embodiments of the invention have been described, those skilled in the art will readily appreciate that many modifications are possible in the exemplary embodiments without materially departing from the novel teachings and advantages of the invention. Accordingly, all such modifications are intended to be included within the scope of the present invention as defined in the claims. In the claims, means-plus-function clauses are intended to cover the structures described herein as performing the recited function and not only structural equivalents but also equivalent structures. Therefore, it is to be understood that the foregoing is illustrative of the invention and is not to be construed as limited to the specific exemplary embodiments disclosed, and that modifications to the disclosed exemplary embodiments, as well as other exemplary embodiments, are intended to be included within the scope of the appended claims. The invention is defined by the following claims, with equivalents of the claims to be included therein.

What is claimed is:

1. A method of driving shutter glasses of a display system, the method comprising:
   generating a display panel driving signal which drives a display panel of the display system, wherein the display panel displays a left image and a right image;
   generating a second three-dimensional (3D) synchronizing signal based on a first 3D synchronizing signal and the display panel driving signal;
   generating a third 3D synchronizing signal by adjusting an intensity of the second 3D synchronizing signal;

generating a shutter control signal, which controls a left shutter and a right shutter of the shutter glasses, based on the third 3D synchronizing signal; and outputting the shutter control signal to the shutter glasses.

2. The method of claim 1, wherein the display panel driving signal includes a vertical start signal which controls a gate driver of the display system, and the gate driver provides a gate signal to the display panel.

3. The method of claim 1, wherein the third 3D synchronizing signal is generated using an amplifying part of the display system, and the amplifying part comprises a bipolar junction transistor.

4. The method of claim 3, wherein the amplifying part further comprises:

a first resistor having a first end portion to which the second 3D synchronizing signal is inputted and a second end portion connected to a base electrode of the bipolar junction transistor; and a variable resistor having a first end portion connected to an emitter electrode of the bipolar junction transistor and a second end portion connected to a ground, wherein a source voltage is applied to a collector electrode of the bipolar junction transistor, and wherein an emitter electrode of the bipolar junction transistor and the first end portion of the variable resistor are connected to a shutter control signal output part of the display system.

5. The method of claim 1, wherein the third 3D synchronizing signal is generated using an amplifying part of the display system, and the amplifying part comprises a field effect transistor.

6. The method of claim 5, wherein the amplifying part further comprises:

a first resistor having a first end portion to which the second 3D synchronizing signal is inputted and a second end portion connected to a gate electrode of the field effect transistor;

a second resistor having a first end portion connected to the first end portion of the first resistor and a second end portion connected to a ground; and a variable resistor having a first end portion to which a source voltage is applied and a second end portion connected to a shutter control signal output part, wherein a drain electrode of the field effect transistor is connected to a shutter control signal output part of the display system, and wherein a source electrode of the field effect transistor is connected to a ground.

7. The method of claim 1, further comprising generating the first 3D synchronizing signal based on input image data.

8. The method of claim 1, wherein the shutter control signal is an infrared ray signal.

9. A display system comprising:

a display panel which displays a left image and a right image;

a driving signal generating part which generates a display panel driving signal which drives the display panel;

a three-dimensional (3D) synchronizing signal generating part which generates a second 3D synchronizing signal based on a first 3D synchronizing signal received from an outside thereof and the display panel driving signal;

an amplifying part which generates a third 3D synchronizing signal by adjusting an intensity of the second 3D synchronizing signal; and a shutter control signal output part which generates a shutter control signal based on the third 3D synchronizing signal, and outputs the shutter control signal to shutter glasses, wherein the shutter control signal controls a left shutter and a right shutter of the shutter glasses.

10. The display system of claim 9, further comprising a gate driver which provides a gate signal to the display panel using the display panel driving signal, and wherein the display panel driving signal includes a vertical start signal.

11. The display system of claim 9, wherein the amplifying part comprises a bipolar junction transistor.

12. The display system of claim 11, wherein the amplifying part further comprises:

a first resistor having a first end portion to which the second 3D synchronizing signal is inputted and a second end portion connected to a base electrode of the bipolar junction transistor; and a variable resistor having a first end portion connected to an emitter electrode of the bipolar junction transistor and a second end portion connected to a ground, wherein a source voltage is applied to a collector electrode of the bipolar junction transistor, and wherein an emitter electrode of the bipolar junction transistor and the first end portion of the variable resistor are connected to a shutter control signal output part.

13. The display system of claim 9, wherein the amplifying part comprises a field effect transistor.

14. The display system of claim 13, wherein the amplifying part further comprises:

a first resistor having a first end portion to which the second 3D synchronizing signal is inputted and a second end portion connected to a gate electrode of the field effect transistor;

a second resistor having a first end portion connected to the first end portion of the first resistor and a second end portion connected to a ground; and a variable resistor having a first end portion to which a source voltage is applied and a second end portion connected to a shutter control signal output part, wherein a drain electrode of the field effect transistor is connected to the shutter control signal output part, and wherein a source electrode of the field effect transistor is connected to a ground.

15. The display system of claim 9, wherein the 3D synchronizing signal generating part is disposed on a display panel control board, and the amplifying part is disposed on the display panel control board.

16. The display system of claim 9, further comprising a graphic processing unit which generates the first 3D synchronizing signal based on input image data.

17. The display system of claim 16, wherein the graphic processing unit is disposed on a set board, and the amplifying part is disposed on the set board.

18. The display system of claim 9, wherein the shutter control signal is an infrared ray signal.

* * * * *